(12) United States Patent
Yoon et al.

(10) Patent No.: US 10,346,383 B2
(45) Date of Patent: Jul. 9, 2019

(54) HYBRID DATABASE TABLE STORED AS BOTH ROW AND COLUMN STORE

(71) Applicant: SAP SE, Walldorf (DE)

(72) Inventors: Yongsik Yoon, Seocho-ku (KR); Chanho Jeong, Seocho-ku (KR); Juchang Lee, Seocho-ku (JP); Chang Bin Song, Seocho-ku (KR); Yong Sik Kwon, Seocho-ku (KR); Sang Kyun Cha, Seocho-ku (KR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/260,181

(22) Filed: Sep. 8, 2016

(65) Prior Publication Data

US 2016/0378813 A1    Dec. 29, 2016

Related U.S. Application Data

(63) Continuation of application No. 14/543,022, filed on Nov. 17, 2014, now Pat. No. 9,465,843, which is a
(Continued)

(51) Int. Cl.
*G06F 16/27*    (2019.01)
*G06F 16/2453*   (2019.01)
(Continued)

(52) U.S. Cl.
CPC ............. *G06F 16/23* (2019.01); *G06F 16/22* (2019.01); *G06F 16/2282* (2019.01);
(Continued)

(58) Field of Classification Search
USPC ............... 707/809, 714, 719, 737, 957, 963
See application file for complete search history.

(56) References Cited

U.S. PATENT DOCUMENTS

| 5,878,409 A | 3/1999 | Baru |
| 6,523,040 B1 | 2/2003 | Lo et al. |

(Continued)

OTHER PUBLICATIONS

Ravishankar Ramamurthy et al., "A Case for Fractured Mirrors," Proceedings of the International Conference on Very Large Data Bases, VLDB Conference, Rome, Italy, Sep. 11-14, 2001.
(Continued)

*Primary Examiner* — Cheyne D Ly
(74) *Attorney, Agent, or Firm* — Fountainhead Law Group P.C.

(57) ABSTRACT

A hybrid database table is stored as both a row and a column store. One or more techniques may be employed alone or in combination to enhance performance of the hybrid table by regulating access to, and/or the size of, the processing-intensive column store data. For example during an insert operation, the column store data may be searched for a uniqueness violation only after certain filtering and/or boundary conditions have been considered. In another technique, a hybrid table manager may control movement of data to the column store based upon considerations such as frequency of access, or underlying business logic. In still another technique, querying of the hybrid table may result in a search of the column store data only after an initial search of row store data fails to return a result.

11 Claims, 15 Drawing Sheets

Related U.S. Application Data continuation of application No. 13/334,711, filed on Dec. 22, 2011, now Pat. No. 8,918,436.

(51) Int. Cl.
| | |
|---|---|
| *G06F 16/2455* | (2019.01) |
| *G06F 16/9535* | (2019.01) |
| *G06F 16/23* | (2019.01) |
| *G06F 16/22* | (2019.01) |

(52) U.S. Cl.
CPC ...... *G06F 16/2453* (2019.01); *G06F 16/2455* (2019.01); *G06F 16/24544* (2019.01); *G06F 16/278* (2019.01); *G06F 16/9535* (2019.01)

(56) References Cited

U.S. PATENT DOCUMENTS

| | | | |
|---|---|---|---|
| 6,804,667 B1 * | 10/2004 | Martin | G06F 17/30489 |
| | | | 707/754 |
| 2002/0184253 A1 * | 12/2002 | Agarwal | G06F 17/30091 |
| 2003/0028509 A1 | 2/2003 | Sah et al. | |
| 2003/0217033 A1 | 11/2003 | Sandler et al. | |
| 2004/0030685 A1 | 2/2004 | Helles et al. | |
| 2008/0317242 A1 | 12/2008 | Bohush et al. | |
| 2009/0037365 A1 | 2/2009 | Sinclair et al. | |
| 2011/0302226 A1 | 12/2011 | Abadi et al. | |
| 2012/0084287 A1 * | 4/2012 | Lakshminarayan | |
| | | | G06F 17/30536 |
| | | | 707/737 |
| 2012/0117064 A1 | 5/2012 | Draese et al. | |
| 2012/0166402 A1 * | 6/2012 | Pederson | G06F 17/30312 |
| | | | 707/692 |
| 2012/0173515 A1 | 7/2012 | Jeong et al. | |
| 2013/0151502 A1 | 6/2013 | Yoon et al. | |
| 2013/0166553 A1 | 6/2013 | Yoon et al. | |
| 2013/0166554 A1 | 6/2013 | Yoon et al. | |

OTHER PUBLICATIONS

Jens Dittrich et al., "Towards a One Size Fits All Databases Architecture," Proceedings of the 5th Biennial Conference on Innovative Data Systems Research (CIDR 2011), Jan. 6, 2011.

Herodotos Herodotou et al., "Query Optimization Techniques for Partitioned Tables," Proceeding SIGMOD '11 Proceedings of the 2011 International Conference on Management of Data, ACM, New York, Jun. 12, 2011, pp. 49-60.

Schaffner, J. et al., "A Hybrid Row-Column OLTP Database Architecture for Operational Reporting," Business Intelligence for the Real-Time Enterprise: Second International Workshop, Birte 2008, Auckland, New Zealand, Aug. 24, 2008, pp. 1-14.

Extended European Search Report (from a corresponding foreign application), EP 12006518.0, dated Apr. 13, 2013.

Ming-Ling Lo, Kun-Lung Wu and P. S. Yu, "TabSum: a flexible and dynamic table summarization approach," Distributed Computing Systems, 2000. Proceedings. 20th International Conference on, Taipei, 2000, pp. 628-635.

Paulo Sergio Almeida, "Scalable Bloom Filters", Information Processing Letters, Oct. 20, 2006, 7 pages.

* cited by examiner

HYBRID DATABASE TABLE STORED AS BOTH ROW AND COLUMN STORE

CROSS REFERENCES TO RELATED APPLICATIONS

This application is a continuation of U.S. patent application Ser. No. 14/543,022 filed Nov. 17, 2014, which is a continuation of U.S. patent application Ser. No. 13/334,711, filed Dec. 22, 2011, titled "HYBRID DATABASE TABLE STORED AS BOTH ROW AND COLUMN STORE", which is incorporated by reference in its entirety for all purposes.

BACKGROUND

The present invention relates to storage of data in databases, and in particular, to the storage of database information in a hybrid table format.

Unless otherwise indicated herein, the approaches described in this section are not prior art to the claims in this application and are not admitted to be prior art by inclusion in this section.

A database is an electronic filing system that stores data in a structured way. The primary storage structure in a database is a table. A database may contain multiple tables and each table may hold information of a specific type. Database tables store and organize data in horizontal rows and vertical columns. Rows typically correspond to real-world entities or relationships that represent individual records in a table. Columns may denote specific attributes of those entities or relationships, such as "name," "address" or "phone number." For example, Company X may have a database containing a "customer" table listing the names, addresses and phone numbers of its customers. Each row may represent a single customer and the columns may represent each customer's name, address and phone number.

Databases are generally stored in computer memory that is one-dimensional. Two-dimensional database tables must therefore be mapped onto a one-dimensional data structure to be stored within a database. One mapping approach involves storing a table in a database row-by-row (i.e., a row-oriented storage model). This approach keeps information about a single entity together. For example, row-by-row storage may store all information about a first customer first, then all information about a second customer and so on. Alternatively, a table may be stored in a database column-by-column (i.e., a column-oriented storage model). This approach keeps like attributes of different entities together. For example, column-by-column storage may store all customer names first, then all customer addresses and so on.

Data must generally be accessed from a table in the same manner that it was stored. That is, conventional computer storage techniques require dedicated query operators that can access specific types of storage models. For example, row query operators are used to process data stored in a database in row-formatted storage models and column query operators are used to process data stored in column-formatted storage models.

Choosing which storage model to use thus often depends on how data will be used. Row-oriented storage models are commonly well-suited for transactional queries. The row-store format emphasizes the database row as the manipulable element, and is typically used for On-Line Transaction Processing (OLTP) involving a relatively large number of on-line transactions (rows), with each transaction characterized by relatively larger data types (columns).

By contrast, column-oriented storage models are generally well-suited for analytical queries. The column-store format emphasizes the database column as the manipulable element, and is typically used for On-Line Analytical Processing (OLAP) of a subset of a total number of transactions (rows) over a fewer number of data types (columns) that may include aggregations of basic data types. A database table in the column-store format is typically used for interrogation and analysis of the raw data for purposes of problem-solving and planning that form a part of Business Intelligence (BI) efforts.

In summary, row store may be useful for retrieving individual records having many columns with a primary key condition. Column store may be useful for performing more complex functions such as aggregation/join over a relatively small number of columns.

Accordingly, conventional query processing schemes are bound to the underlying storage model of the database being queried. In reality, however, a database having certain data stored in a column-formatted storage model may be asked to handle a transactional query relating to that data, or a database having certain data stored in a row-formatted storage model may be asked to handle an analytical query relating to that data. For example, a database having data stored in a row-formatted storage model may receive a mixed set of queries requiring transactional and analytical processing of that data.

Both the row-store and column-store database table formats offer various benefits. For example, the row-store format offers ready scalability for data, as it is expected that more and more transactions will require storage in additional rows. The row-store table format is, however, relatively memory intensive for analytic queries (e.g. aggregation, join) as it scans a table vertically, incurring cache misses as the data is stored horizontally.

Conversely, the column-store format offers flexibility in allowing complex manipulation of data involving table joins and aggregation, as well as relatively low memory consumption by allowing compression within data types across multiple entries by dictionary encoding. The column-store database format, however, typically does not allow ready manipulation of the same volumes of data as the row-store table.

Thus, a row-store table is more effective to serve row-wise record access such as single record selection with primary key lookup. A column-store table is better to serve column-wise record access such as single column aggregation. For row-wise record access, column-store table becomes memory-intensive, because the data format is organized vertically in column-store so that cache misses occur while accessing record values horizontally. For column-wise record access, row-store table becomes memory-intensive because the data format is organized horizontally in row-store, so that cache misses occur while reading specific column values.

Despite the various advantages of the various database table types, conventionally a table can generally only be in row- or column-store at any point in time of a business life cycle. Accordingly, the present disclosure addresses this and other issues with systems and methods for implementing a hybrid database table stored as both a row and a column store.

SUMMARY

A hybrid database table is stored as both a row and a column store. One or more techniques may be employed alone or in combination to enhance performance of the hybrid table by regulating access to, and/or the size of, the processing-intensive column store data. For example during an insert operation, the column store data may be searched for a uniqueness violation only after certain filtering and/or boundary conditions have been considered. In another technique, a hybrid table manager may control movement of data to the column store based upon considerations such as frequency of access, or underlying business logic. According to still another technique, querying of the hybrid table may result in a search of the column store data only after an initial search of row store data fails to return a result.

An embodiment of a computer-implemented method, comprises, providing in a non-transitory computer readable storage medium, a database created in an application level language and comprising a row partitioned store and a column partitioned store. A query is received from a user. The row partitioned store is searched based upon the query. An optimization is performed based upon a search of the row partitioned store. The column partitioned store is searched based upon the query, only if warranted by the optimization. A search result is returned to the user a search result based on the query.

An embodiment of a computer system comprises one or more processors and a software program, executable on said computer system. The software program is configured to receive a query from a user, and search a row partitioned store of a database based on the query, the database created in an application level language and provided in a non-transitory computer readable storage medium, the database further comprising a column partitioned store. An optimization is performed based upon a search of the row partitioned store. The column partitioned store is searched based upon the query, only if warranted by the optimization. A search result is returned to the user based on the query.

An embodiment of a non-transitory computer readable storage medium embodies a computer program for performing a method, said method comprising, receiving a query from a user and searching a row partitioned store of a database based on the query, the database created in an application level language and provided in a non-transitory computer readable storage medium, the database further comprising a column partitioned store. An optimization is performed based upon a search of the row partitioned store. The column partitioned store is searched based upon the query, only if warranted by the optimization. A search result based on the query is returned to the user.

In an embodiment searching the row partitioned store comprises performing a unique key search.

According to some embodiments, the optimization comprises determining if the unique key search of the row partitioned store fails to return a search result.

In particular embodiments, the search result is formed by merging a search result of the row partitioned store with a search result of the column partitioned store.

Some embodiments may further comprise providing a range of values of the row partition store.

In certain embodiments, the optimization may comprise determining whether a search of the row partitioned store satisfies a filter condition comprising the range of values.

The following detailed description and accompanying drawings provide a better understanding of the nature and advantages of the present invention.

DETAILED DESCRIPTION

Described herein are techniques for providing a hybrid database table stored as both a row-store and column-store. Certain techniques, employed alone or in combination, enhance hybrid table performance by limiting access to, and/or the size of, the processing-intensive column store data.

In the following description, for purposes of explanation, examples and specific details are set forth in order to provide a thorough understanding of various embodiments. It will be evident, however, to one skilled in the art that the present invention as defined by the claims may include some or all of the features in these examples alone or in combination with other features described below, and may further include modifications and equivalents of the features and concepts described herein.

Figure 1:
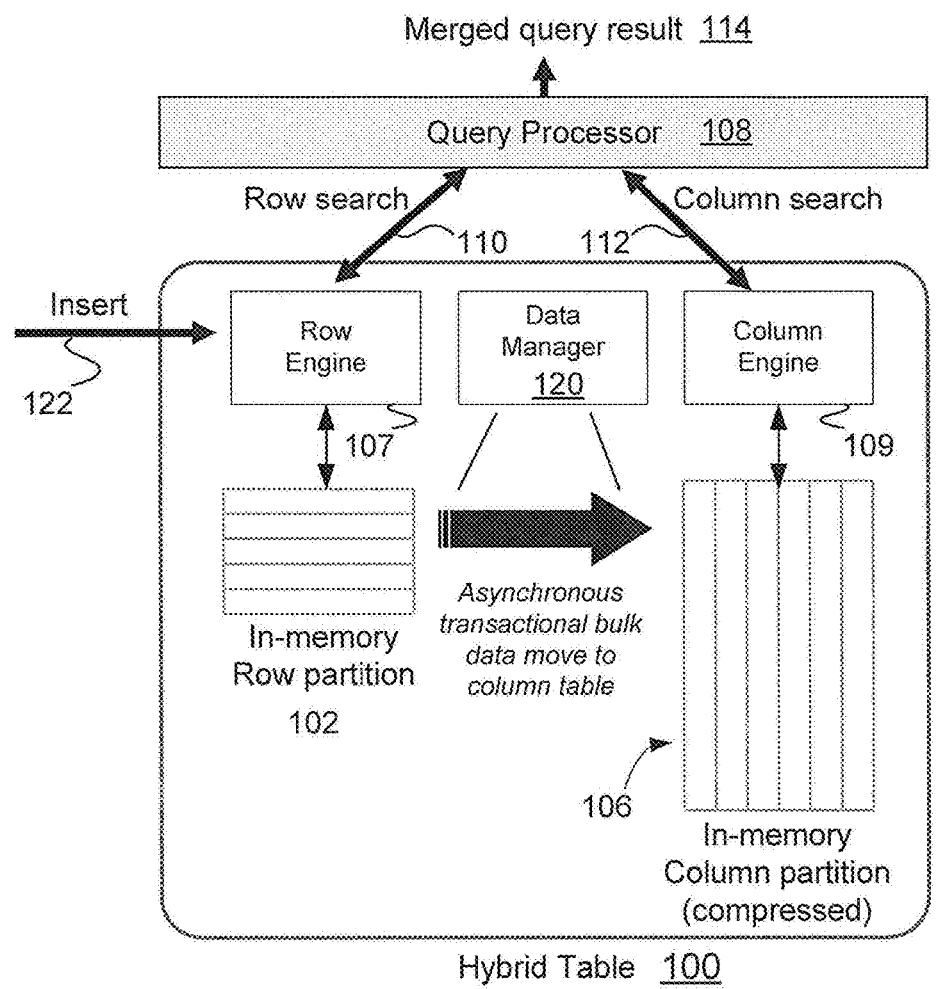
FIG. 1 shows a simplified schematic view of the structure and operation of a hybrid table according to an embodiment.

FIG. 1 shows a simplified schematic view of a hybrid table according to an embodiment. The hybrid table 100 comprises a first data store 102 comprising data stored according to an in-memory row partition. The hybrid table also comprises a second data store 106 comprising data stored according to an in-memory column partition. As mentioned above, accessing data in the column store orientation is more processing-intensive than accessing data in the row store orientation.

A query processor 108 is in communication with the hybrid table to perform row searching and column searching, respectively, utilizing row engine 107 and column engine 109. The row search result 110 and the column search result 112 are returned to the query processor, and a merged query search result 114 is returned to the user.

The arrow 122 of FIG. 1 shows the function of inserting a new record into the hybrid table. As described in detail below, this insert function can be optimized to enhance performance of the hybrid table.

FIG. 1 also shows that data in the hybrid table may be moved from the relatively update-intensive row partition orientation, to the relatively read-intensive column partition orientation. Data manager 120 is responsible for this data movement, which under certain circumstances may take the form of an asynchronous transactional bulk data move to the column table.

The asynchronous data movement is designed to exploit favorable attributes of both row- and column-partition. From a performance perspective, it may be desirable to place records that are recently inserted, frequently updated, and/or searched with primary key condition, in row-partition. It is desirable to place records that are not frequently updated but sometimes aggregated, in column-partition.

From a memory consumption perspective, it may be desirable to maintain row partition as small as possible, because as row-partition is not compressed. Thus, the memory consumed for a same amount of records is usually larger than for column-partition.

Accordingly, embodiments of hybrid tables may seek to avoid sacrificing OLTP performance (maintaining relevant data in row store), and to improve aggregation performance (maintaining stable, aged, for-aggregation data, in column store), while maintaining reasonable memory consumption (e.g. through row/column boundary management).

A hybrid table according to embodiments of the present invention may offer certain potential benefits. In particular, the presence of the data stored in the row store orientation offers fast access. Data stored in the row store orientation is amenable to single table select with search conditions (e.g. exact match/range). Thus fast "Simple Select" queries may be used for access to the row partitioned data store. The row partitioned data store also affords scalable update and search performance.

Moreover, the presence of the row partitioned data store allows concurrent workload handling with a lean stack. Performance of functions such as insert, update, and delete, as well as simple searching (exact match/range) are possible with relatively low consumption of system resources. And, execution in the row engine may be pipelined.

Regarding the column store data, memory consumption may be reduced by dictionary encoding of the column table. The column table also affords rapid OLAP processing by the column engine.

Embodiments of the present invention may seek to maintain performance of the hybrid table, by limiting access to, or the size of, the processing-intensive column store data. One example of this can occur during an insert operation, as shown in FIG. 2.

Figure 2:
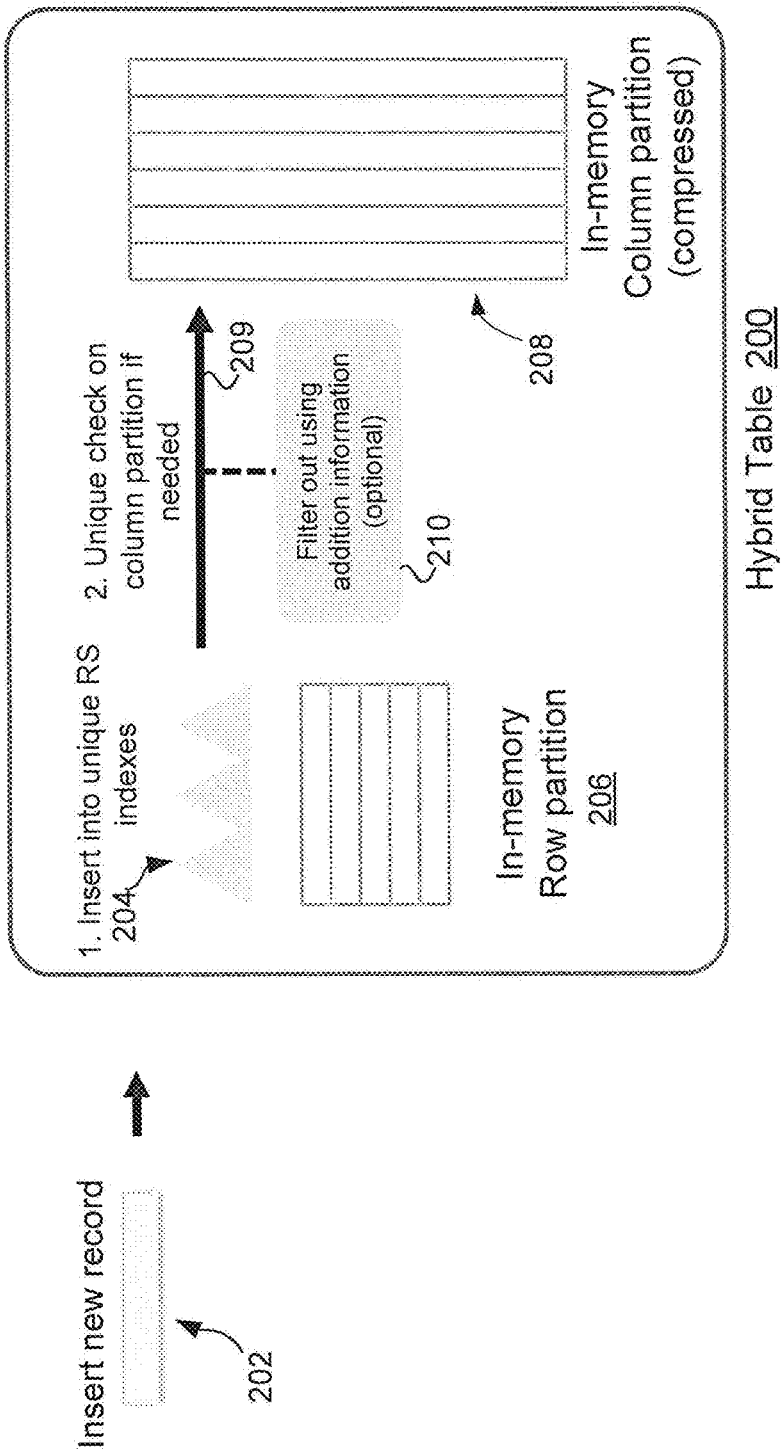
FIG. 2 shows a simplified schematic view of the insertion of a new record into an embodiment of a hybrid table.

In particular, FIG. 2 shows a simplified schematic view of the insertion of a new record into a hybrid table 200. First, a new record 202 is inserted into unique row store (RS) indexes 204 associated with the in-memory row partition data store 206.

According to particular embodiments, before resorting to search each value in the column partitioned data store 208 (a processing-intensive prospect), in order to check for uniqueness violations the hybrid table first performs an optimization 209 based on additional information.

Figure 2A:
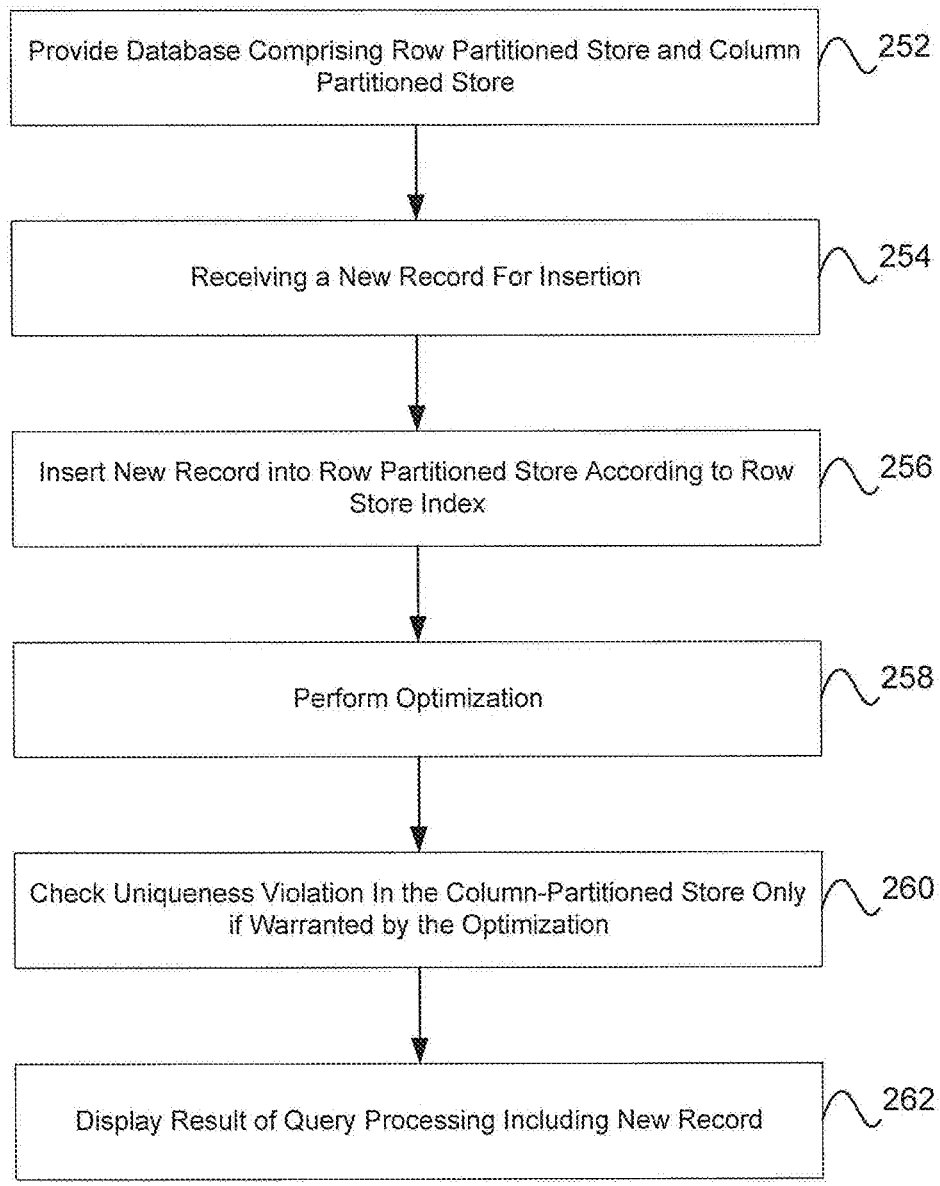
FIG. 2A shows a simplified view of a process flow for the insertion of a new record into an embodiment of a hybrid table.

FIG. 2A shows a simplified view of a process flow 250 for the insertion of a new record into an embodiment of a hybrid table. A first step 252 comprises providing in a non-transitory computer readable storage medium, a database created in an application level language and comprising row partitioned store and column partitioned store. A second step 252 comprises receiving a new record to be inserted into the database. A third step 256 comprises causing a row engine to insert the new record into the row partitioned store according to a row store index. A fourth step 258 comprises performing an optimization based upon additional information to check for a uniqueness violation. A fifth step 260 comprises checking uniqueness violation in the column partitioned store, only if warranted by the optimization. A sixth step 262 comprises displaying a result of processing a query to the database including the new record.

A first optimization approach is to maintain min/max values of unique columns on column partition with latch-free structure to minimize contention. This approach may possibly result in many false hits for multi-column unique keys.

A second optimization approach is to maintain a filter (such as a Bloom filter) for unique columns. This filtering approach 210, is beneficial in that it requires updating or rehashing only when data is moved from the row store orientation to the column data store orientation.

In particular, a Bloom filter is a data structure to effectively filter out any element that does not belong to a set. The Bloom filter comprises a bit vector and a set of hash functions. If the Bloom filter returns FALSE, then the element is definitely not a member of the set. If the Bloom filter returns TRUE, then the element is probably in the set.

Figure 3A:
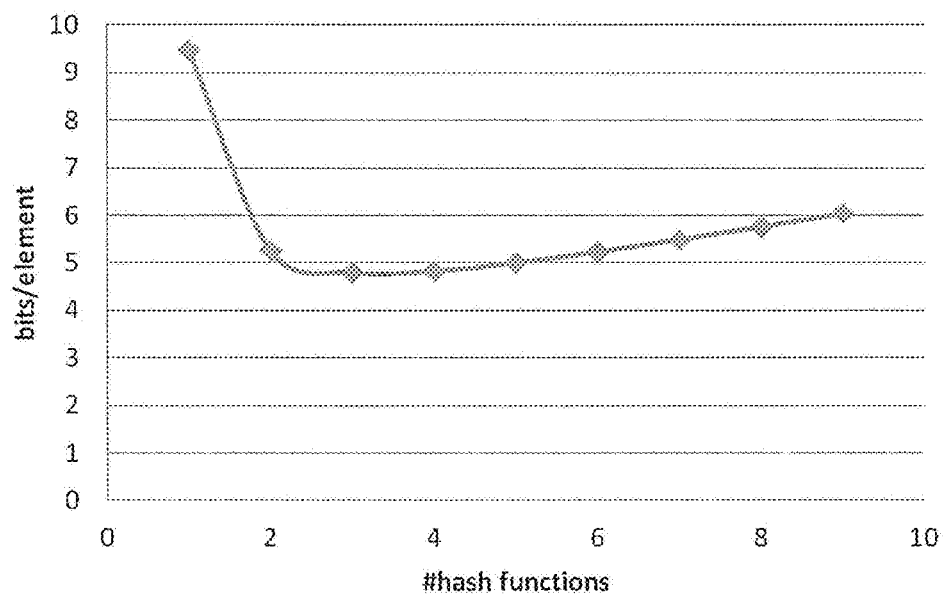
FIG. 3A plots performance of a Bloom filter as bits/element vs. number of hash functions.

FIG. 3A plots performance of a Bloom filter as bits/element vs. number of hash functions, with a False Positive Rate (FPR) of 0.1. The FPR depends on the number of hash functions and the number of element/(size of bit vector).

In certain embodiments, hybrid table performance during insert handing may be enhanced through the use of a Bloom filter. In particular, values in the column partition data store need be searched only if the Bloom filter returns TRUE.

Use of a standard Bloom filter for this task may consume large amounts of memory. For example, a standard Bloom filter needs about 60 MB to keep FPR≤0.1 with 100 million records.

Figure 3B:
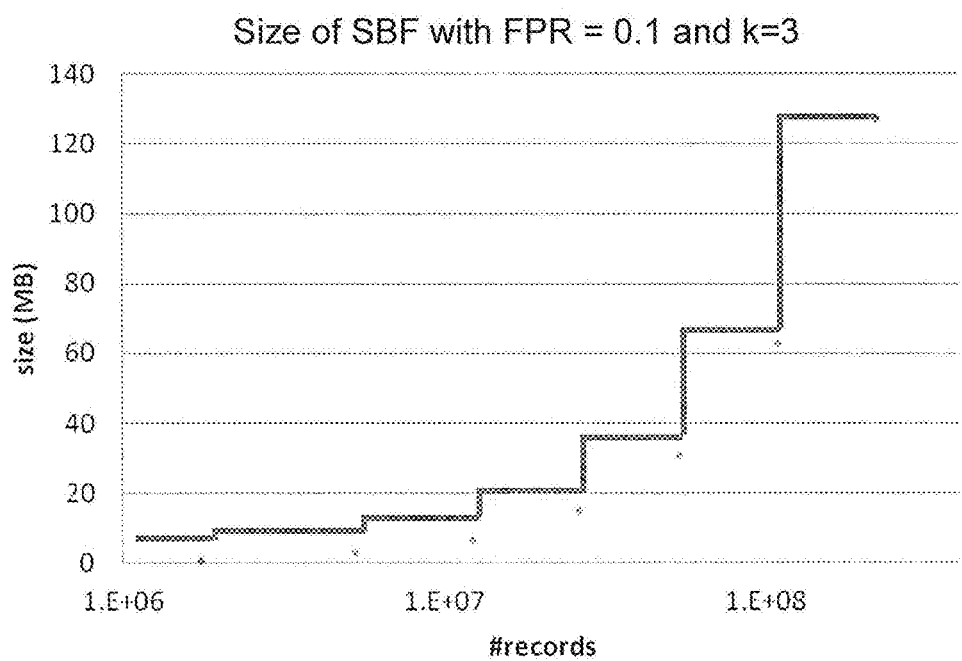
FIG. 3B plots memory size versus number of records, for a scalable Bloom filter.

Accordingly, certain embodiments may employ a Scalable Bloom Filter (SBF) in order to perform optimization of insert handing to a hybrid table. A SBF is a variant of the Bloom filter that uses space proportional to the number of stored elements. The query time for a SBF obeys the following relation:

$$\text{Query time} = O(k \log n), \text{ where:}$$

k=number of hash functions; and
n=number of records.
FIG. 3B plots memory size versus number of records, for a SBF having a FPR=0.1 and k=3.

Optimized insert handling utilizing a SBF, can result in enhanced performance of a hybrid table. This is discussed in connection with the following example.

Example

A data population of 800,000 records was configured in six (6) different table types: row oriented (row, A); column oriented (column, B); hybrid without filtering and all 800,000 records in row store (C); hybrid without filtering and all 800,000 records in column store (D); hybrid with SBF and all 800,000 records in row store (E); and hybrid with SBF and all 800,000 records in column store (F).

Figure 4:
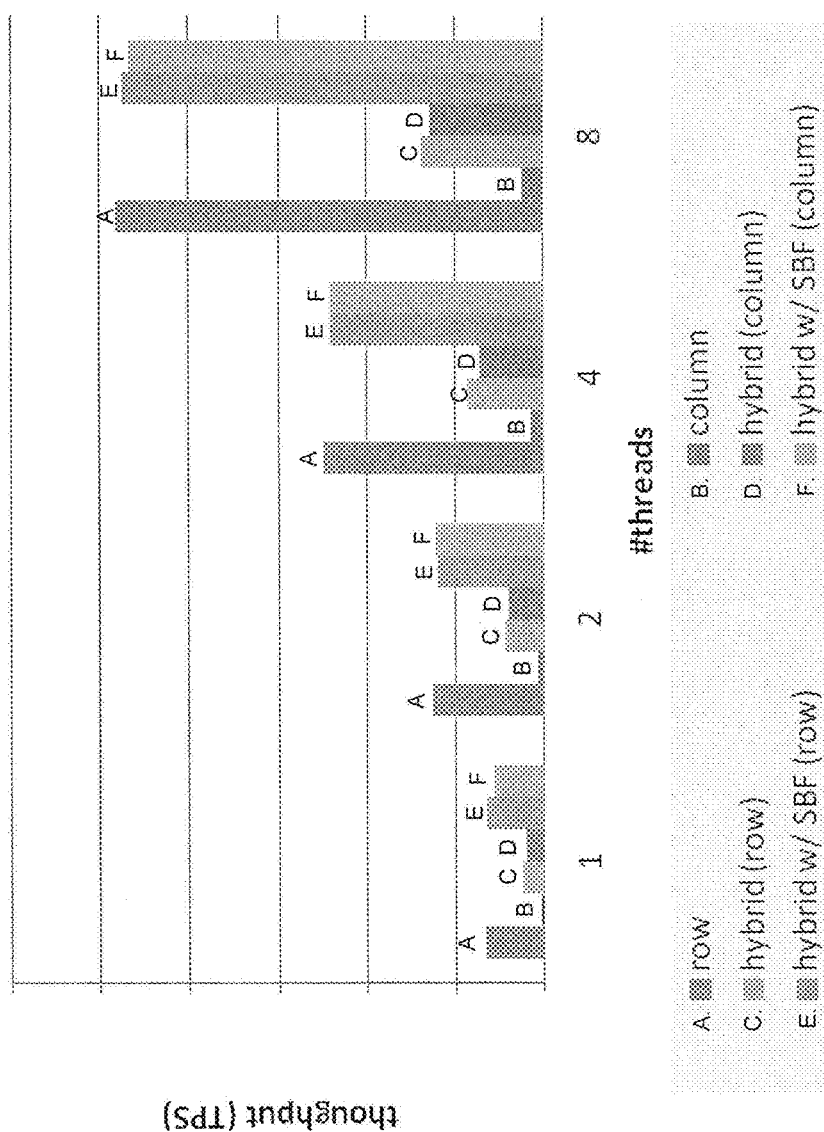
FIG. 4 is a bar chart showing throughput in transactions per second (TPS) during insert handling with different numbers of threads.

FIG. 4 is a bar graph showing throughput in transactions per second (TPS) during insert handling with different numbers of threads. The performance of a hybrid table can be gauged by comparison with a table having data stored in a row orientation (the least processing-intensive format).

FIG. 4 indicates that without filtering (C, D), the insert handing performance of the hybrid table is only about ⅓ that of the row table (A). By contrast where the SBF is used (E, F), the hybrid table shows similar insert handing performance as a row table (A), notwithstanding the fact that the populated data of the hybrid table is located in the column partitioned data store. This represents a significant enhancement, rendering performance of the hybrid database table akin to that of the conventional row-store approach.

While the above discussion has focused upon the use of a scalable Bloom filter for optimization of hybrid table performance, the present invention is not limited to this particular filter type. Different types of index variations for fast value existence checking may be employed. Examples include but are not limited to hash index, b+-tree index, csb+-tree index, and others.

Figure 5:
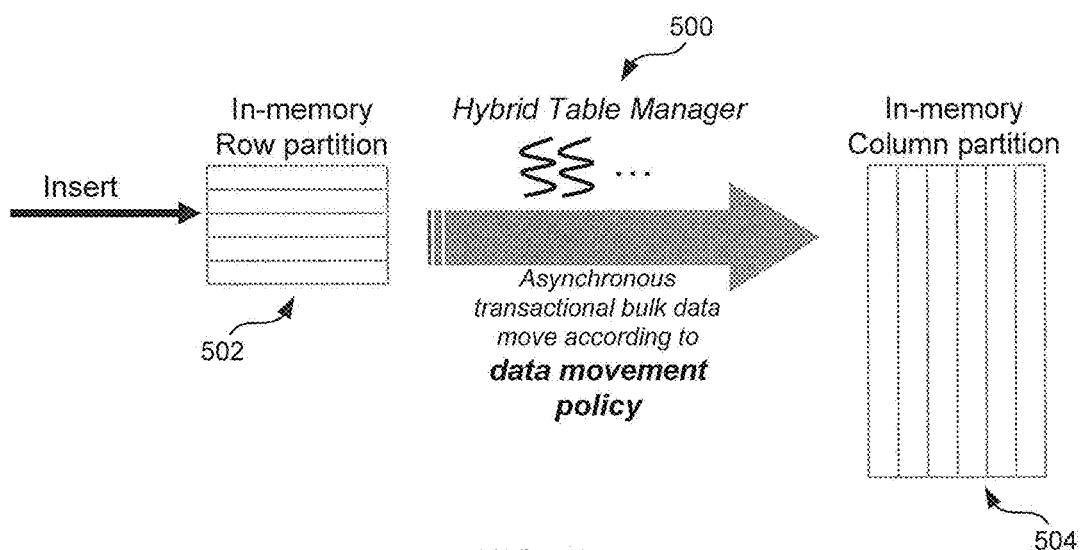
FIG. 5 shows a simplified view of controlling data movement in a hybrid table according to an embodiment.

Another technique which may be employed to enhance performance of a hybrid table, is to selectively move records to and from the column partitioned data store in order to control its size. FIG. 5 shows a simplified view of controlling data movement in a hybrid table according to an embodiment.

In particular, a hybrid table manager 500 is responsible for controlling the movement of data from an in-memory row partition store 502, to in-memory column partition store 504, according to a data movement policy. By intelligently partitioning data, selective data movement may allow fast OLTP processing avoiding column partition access.

Figure 5A:
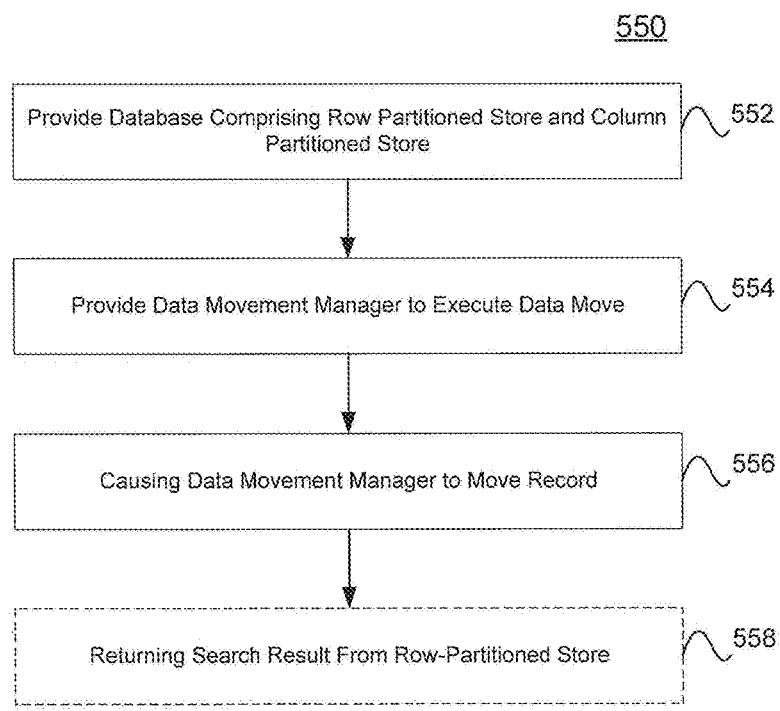
FIG. 5A shows a simplified view of a process flow for the movement of records between row partition store and column partition store in an embodiment of a hybrid table.

FIG. 5A shows a simplified view of a process flow 550 for the movement of records between row partition store and column partition store in an embodiment of a hybrid table. A first step 552 comprises providing in a non-transitory computer readable storage medium, a database created in an application level language and comprising a row partitioned store and a column partitioned store. A second step 554 comprises providing a data movement manager configured to execute a data move from the row partitioned store to the column partitioned store according to a data movement policy. A third step 556 comprises causing the data movement manager to automatically move a record from the row partitioned store to the column partitioned store upon satisfaction of a condition of the data movement policy. In an optional fourth step 558, a search result of the row partitioned store is returned to the user.

One example of a data movement policy is based upon access. As this data movement policy does not rely upon knowledge of business rules (see below), it may serve as the default.

According to an access-based data movement policy, the hybrid table manager moves some portion of records on the row partition to the column partition, when the number of records on row partition exceeds a defined threshold. This access-based data movement can be based upon statistics maintained for accessed records, such that when a movement is triggered those records having a lower frequency of access are moved. Access statistics may be reset whenever a data movement is finished.

Figure 6:
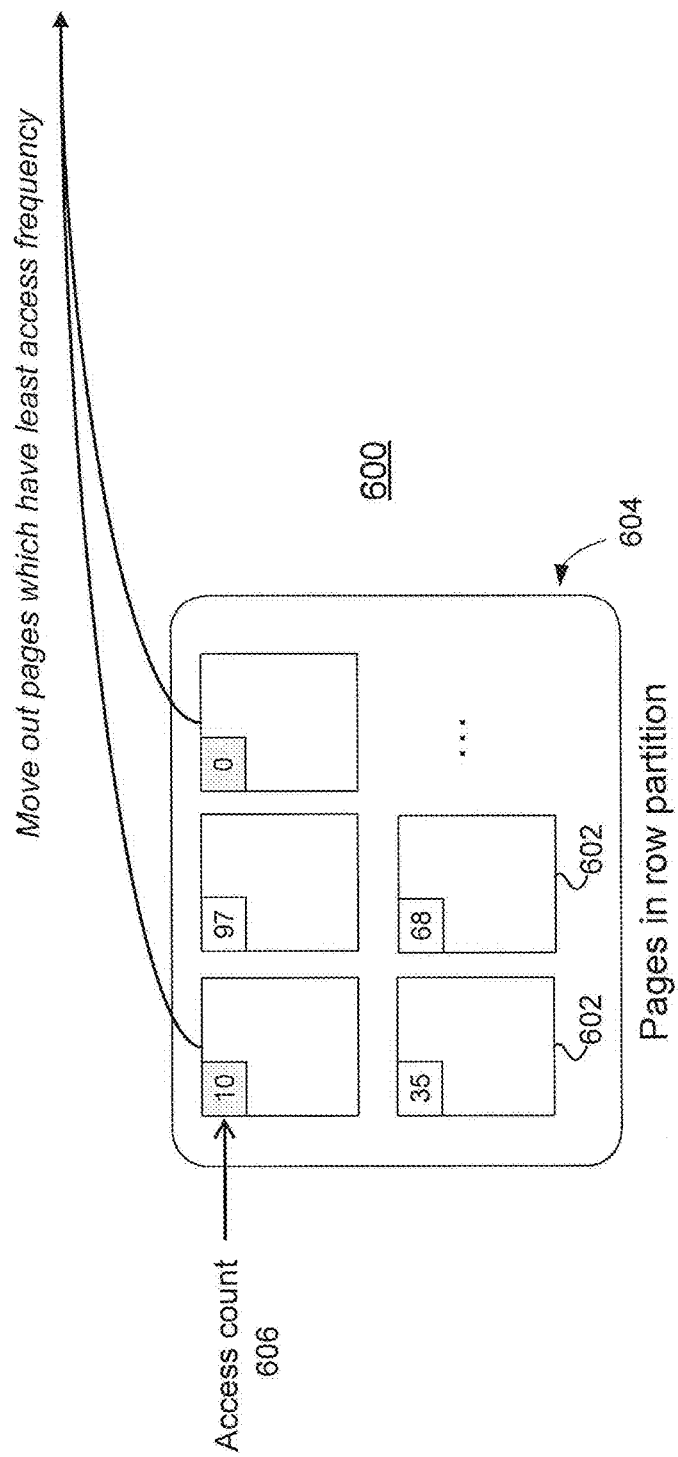
FIG. 6 shows a simplified schematic view of implementation of an access-based data movement policy based upon page-level access statistics management.

FIG. 6 shows a simplified schematic view of implementation of an access-based data movement policy 600 based upon page-level access statistics management. Each of a plurality of pages 602 in a row partition store 604 include an ongoing access count 606. Based upon relatively low numbers of this access count, pages having a least access frequency can be moved out to the column partition data store.

In certain embodiments, frequently accessed records can possibly be moved out of the column partitioned store due to coarse granular access statistics management. For example particular some embodiments could perform page level movement instead of record level management, where a page includes multiple records, some of which are frequently accessed whereas others are not. Such an approach is possible, although an unintended data move may occur for frequently-accessed records.

An alternative data movement policy may be based upon business concepts instead of access frequency. Such a data movement policy may offer the best results when business semantics are known.

According to certain embodiments, business-aware data movement can take the form of condition-based movement. In such an approach, records that satisfy certain business conditions can be moved out to the column partitioned store.

In other embodiments, business-aware data movement can take the form of reference-based movement. In such approaches, records are moved out to the column partitioned store when related records (in referenced table) are moved out.

Figure 7:
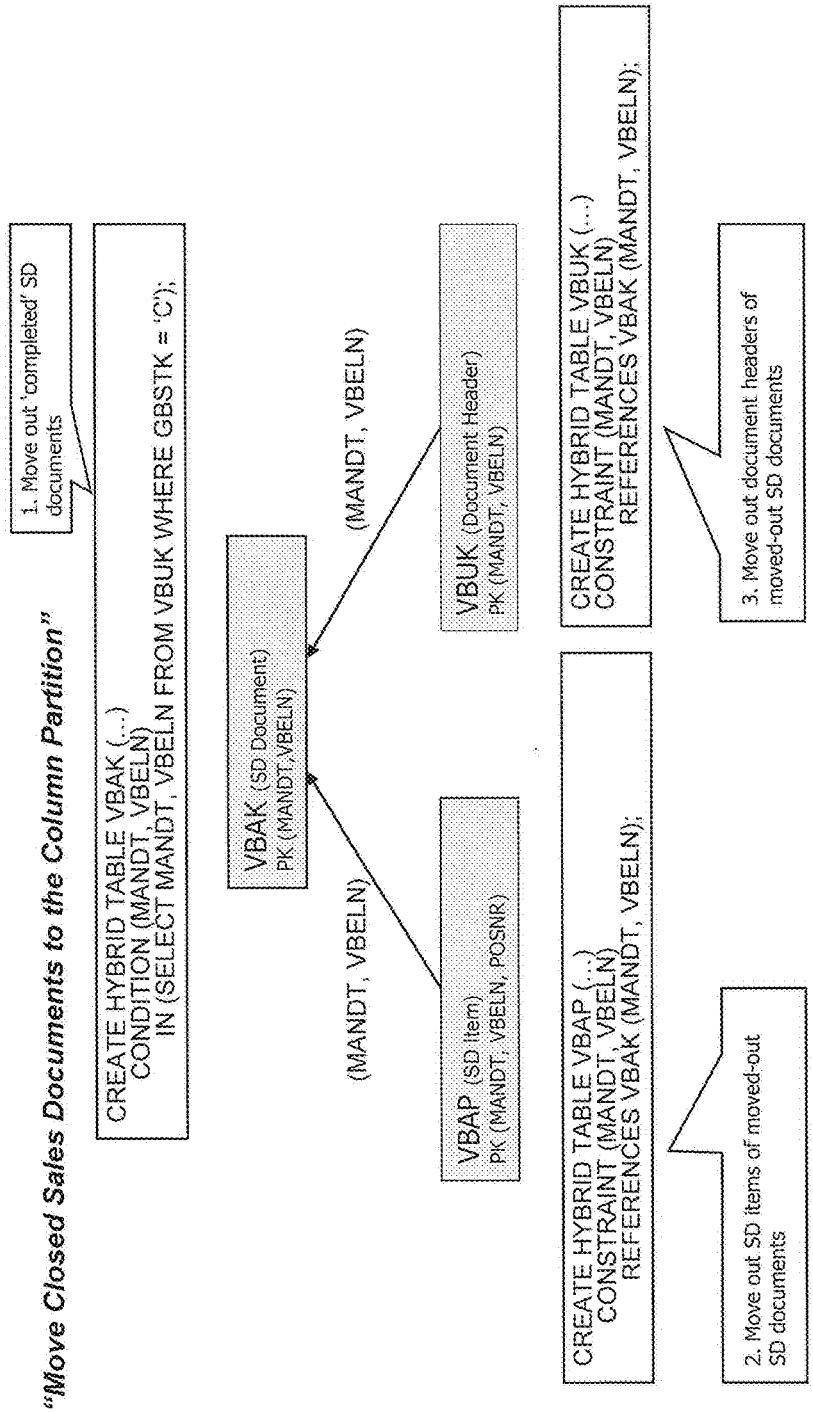
FIG. 7 shows a simplified example of a business-aware data movement policy according to an embodiment.

FIG. 7 shows a simplified embodiment of a business-aware data movement policy 700. In this example, closed sales documents are moved to the column partitioned data store.

This in the example of FIG. 7, for the sales document table VBAK, if the value of GBSTK column is 'C', then it means closed document. So, the move out condition can be specified as GBSTK='C' to move out only closed documents. Closed-document-related records in SD item (VBAP) table and Document header (VBUK) table, can be moved out accordingly by specifying a relationship between tables as move out condition. Here, MANDT and VBELN columns are used to specify this relationship.

Figure 9:
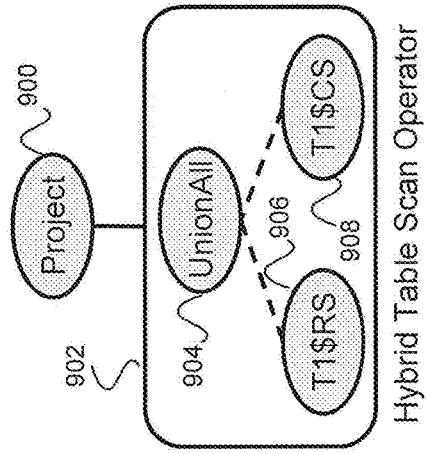
FIG. 9 shows a simplified schematic view of a simple search conducted on a single hybrid table.

Performance of a hybrid table may also be enhanced through optimization of the search function. FIG. 9 shows a simplified schematic view of a simple search conducted on a single hybrid table. Specifically, as part of a project a query 900 is posed to the hybrid table 902. The union 904 of the search results of the row store (RS) 906 and column store (CS) 908, are returned to the user.

Figure 8:
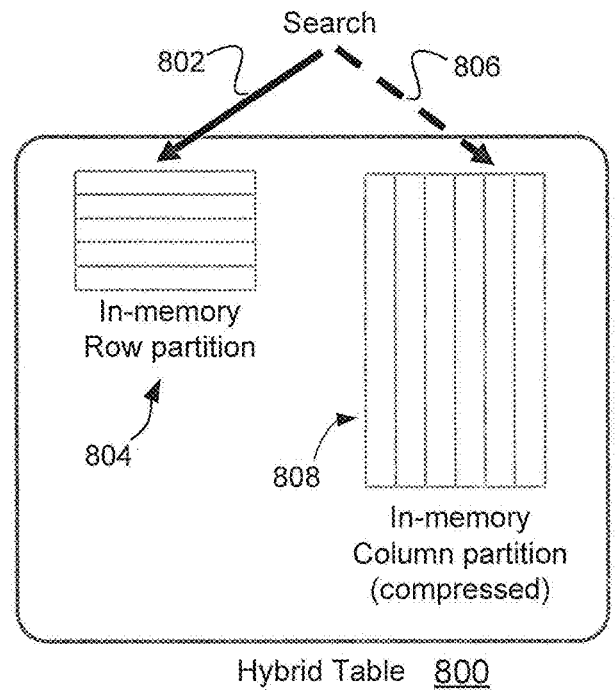
FIG. 8 shows a simplified schematic view of a search operation on a hybrid database according to an embodiment.

According to particular embodiments of the present invention, information such as boundary conditions can be referenced to control access to the column stored data, thereby minimizing column store access for simple queries. FIG. 8 shows a simplified schematic view of a search operation on a hybrid database 800 according to an embodiment.

As described further in detail below, a search 802 can initially be performed on the in-memory row partitioned data store 804. Only once the result of that initial search 802 has been returned, is a decision made whether or not to conduct a further, search 806 of the values stored in the in-memory column partition 808.

Figure 8A:
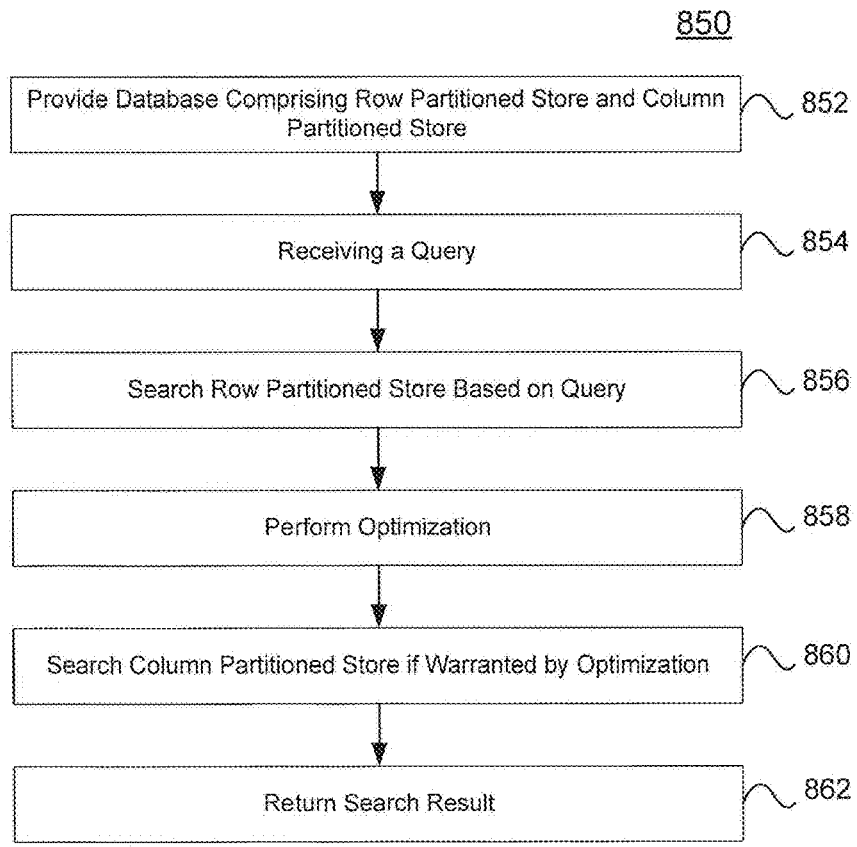
FIG. 8A shows a simplified view of a process flow for searching an embodiment of a hybrid table.

FIG. 8A shows a simplified view of a process flow 850 for searching an embodiment of a hybrid table. A first step 852 comprises providing in a non-transitory computer readable storage medium, a database created in an application level language and comprising a row partitioned store and a column partitioned store. A second step 854 comprises receiving a query from a user. A third step 856 comprises searching the row partitioned store based upon the query. A fourth step 858 comprises performing an optimization based upon a search of the row partitioned store. A fifth step 860 comprises searching the column partitioned store based upon the query, only if warranted by the optimization. In sixth step 862, a search result is returned to the user based on the query.

Figure 10:
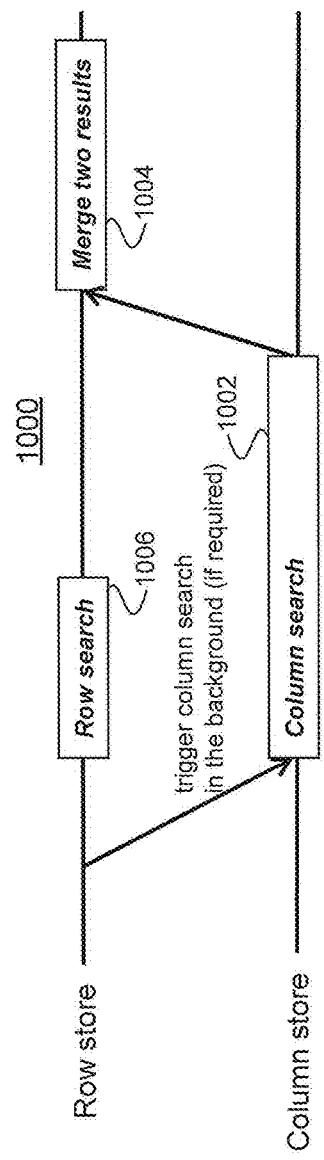
FIG. 10 is a simplified flow diagram showing the resort to the column search if necessary, followed by merger of the row search results and column search results.

If warranted by the optimization, search of the column store data can occur in the background, transparent to the user. For example searches involving a primary key (PK) or a unique-key can be run initially only on the less processing-intensive row store data. If a result is returned from this initial searching, then there is no need to resort to the processing-intensive task of also searching the column store data. The simplified flow diagram of FIG. 10 shows an embodiment of a hybrid database table search 1000, with resort to the column search 1002, followed by merger 1004 of the row search results 1006 and column search results, if necessary.

Filtering according to boundary conditions can also be employed as optimization technique in hybrid table searching. For example, to control access to the column store data, a column dictionary can maintain a minimum and maximum value of each column partition. Searching of the actual column store data could then be limited to only the partition that satisfies a filter condition (e.g. a search condition). A boundary of column partition may be maintained to allow search optimization (limiting column partition access) if a given filter condition does not require column partition access.

Figure 16:
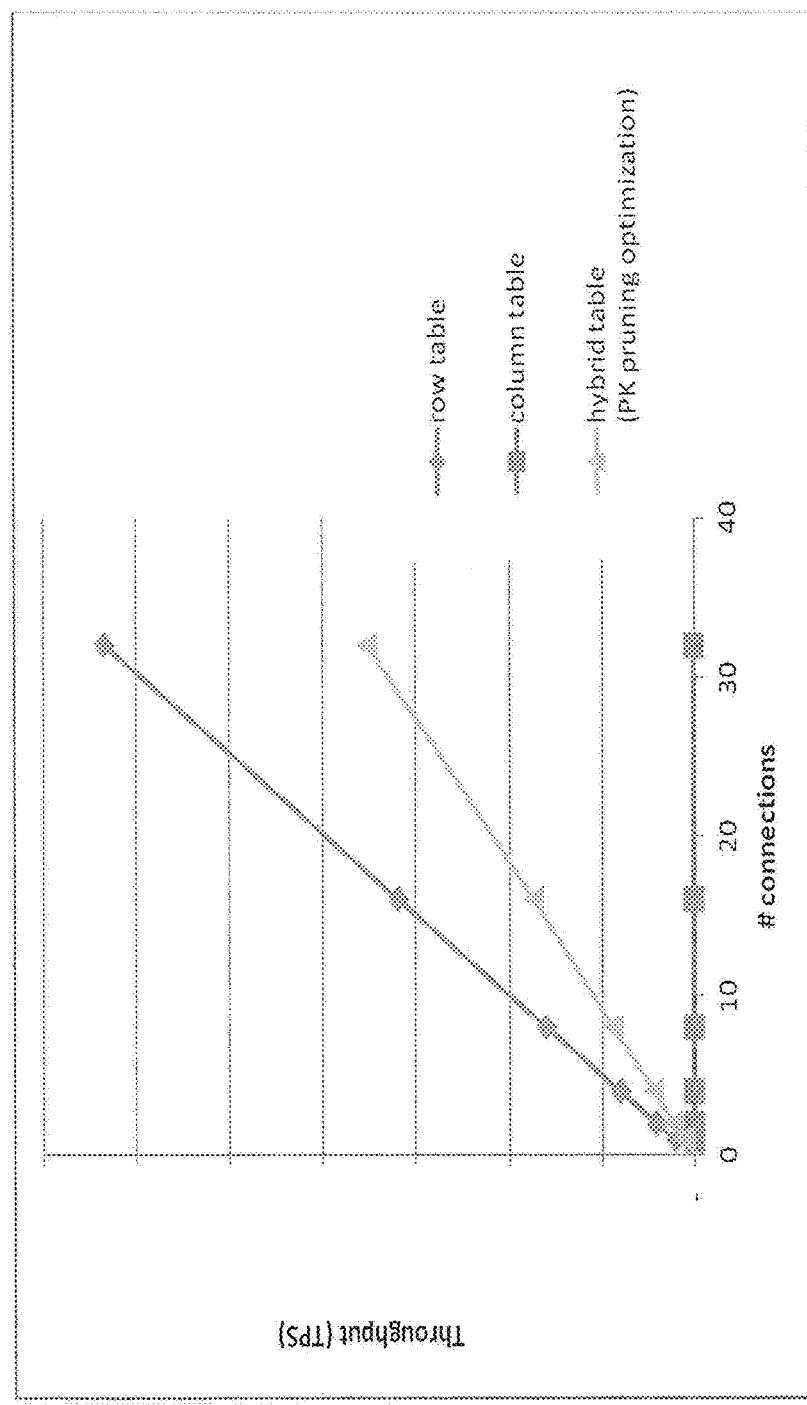
FIG. 16 plots throughput versus number of connections for search performance on conventional row and column store tables, as well as a corresponding hybrid table.

FIG. 16 plots throughput (in threads per second—TPS) versus number of connections, to evaluate performance of a PK exact match search conducted on conventional row and column store tables, and also conducted on a corresponding hybrid table according to an embodiment. FIG. 16 shows that searching a hybrid table with the PK pruning optimization, results in a throughput for the hybrid table that is higher than for the conventional column store table.

More complex searching may be appropriate over multiple hybrid database tables. In particular, such complex searching may involve table join operations.

One technique which may be used for complex searching of multiple hybrid tables, is a conversion-based join. Such a conversion-based join is discussed in detail in U.S. patent application Ser. No. 12/982,673 titled "Processing Database Queries Using Format Conversion", filed Dec. 30, 2010 and incorporated by reference in its entirety herein for all purposes.

Figure 11:
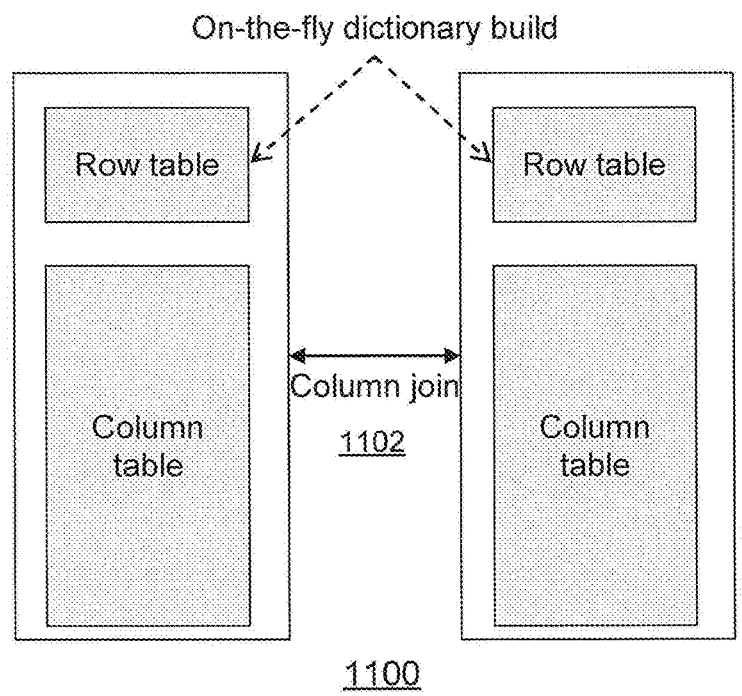
FIG. 11 shows a simplified schematic view of a conversion-based join operation.

FIG. 11 shows a simplified schematic view of a conversion-based join operation 1100. In particular, this approach leverages a column join 1102 for a split table. The row table serves as a partition. This approach employs on-the-fly dictionary generation, and dictionary caching.

An alternative technique which may be used for complex searching of multiple hybrid tables, is a mixed join operation which accesses data stored in its native row- or column-store orientation. Such a native mixed join approach is discussed in detail in U.S. patent application Ser. No. 13/323,530 titled "Mixed Join of Row and Column Database Tables in Native Orientation" filed Dec. 12, 2011, and incorporated by reference in its entirety herein for all purposes.

Figure 12:
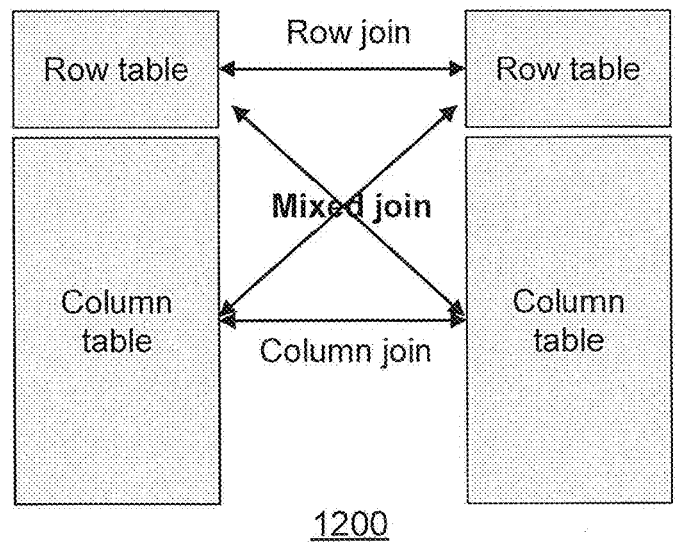
FIG. 12 shows a simplified schematic view of a native mixed join operation.

FIG. 12 shows a simplified schematic view of a native mixed join operation 1200. This approach utilizes a column dictionary as an index. Pruning of the join operation is achieved based upon filtering using the column dictionary index as a data boundary.

Figure 13:
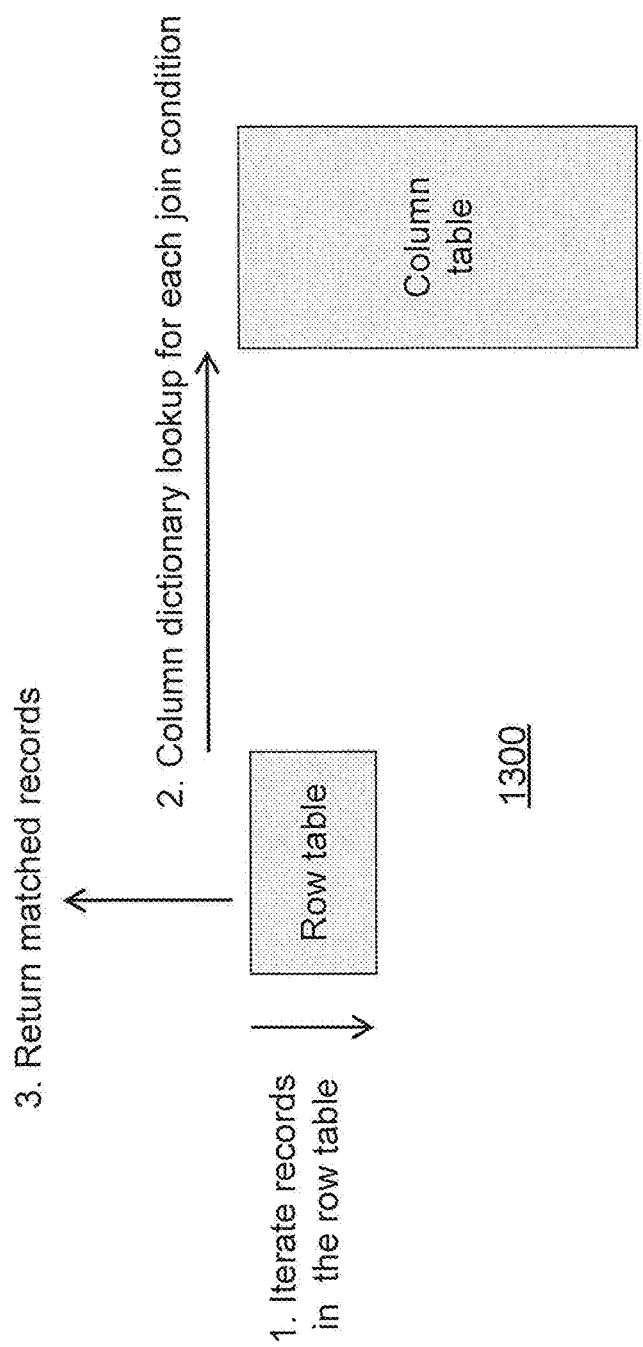
FIG. 13 shows another view of a native mixed join operation.

FIG. 13 shows another view of a native mixed join operation 1300, which uses the column dictionary as an index. First, records are iterated in the row table. The next step involves column dictionary lookup for each join condition. In the third step, matched records are returned.

By employing column dictionary lookup while iterating the row table according to a native mixed join approach, no result materialization is achieved. This also allows pipelined execution using the row identifier.

For multi-column join handling, a full key match may be achieved if a concatenated attribute or an external key exist. Column-by-column matching is possible.

Figure 14:
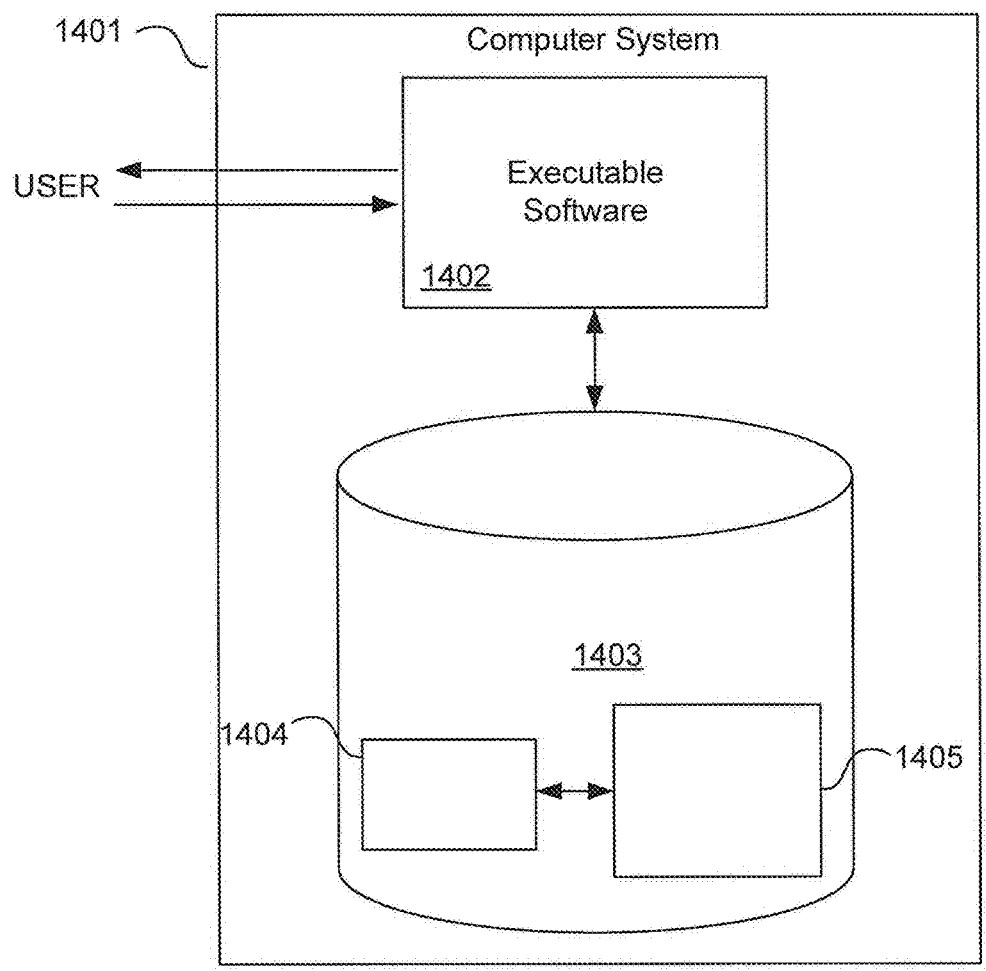
FIG. 14 illustrates hardware of a special purpose computing machine which may be configured to implement a hybrid database table.

FIG. 14 illustrates hardware of a special purpose computing machine which may be configured to implement a hybrid database table according to certain embodiments.

In particular, computer system 1400 comprises a processor 1402 that is in electronic communication with a non-transitory computer-readable storage medium 1403. This computer-readable storage medium has stored thereon code 1405 corresponding to the in-memory row partition. Code 1404 corresponds to an in-memory column partition, both of which may be accessed as part of the hybrid table according to embodiments as has been described above. The system may further comprise code corresponding to the data movement manager, as has been shown and described above.

The apparatuses, methods, and techniques described herein may be implemented as a computer program (software) executing on one or more computers. The computer program may further be stored on a non-transitory computer readable medium. The non-transitory computer readable medium may include instructions for performing the processes described.

The computer system may comprise a software server. A number of software servers together may form a cluster, or logical network of computer systems programmed with software programs that communicate with each other and work together to process requests.

Figure 15:
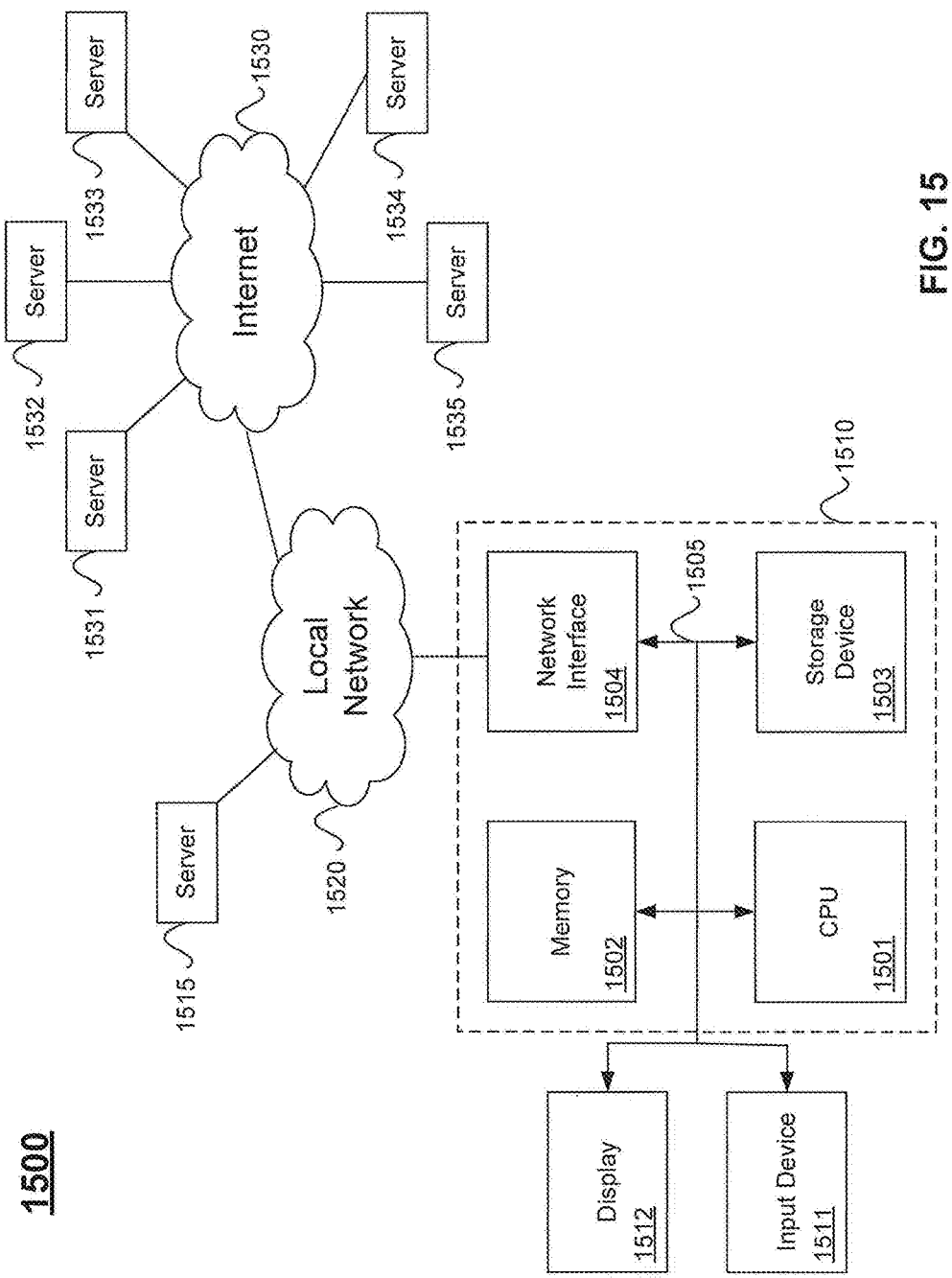
FIG. 15 shows an example of a computer system.

An example computer system 1510 is illustrated in FIG. 15. Computer system 1510 includes a bus 1505 or other communication mechanism for communicating information, and a processor 1501 coupled with bus 1505 for processing information.

Computer system 1510 also includes a memory 1502 coupled to bus 1505 for storing information and instructions to be executed by processor 1501, including information and instructions for performing the techniques described above, for example. This memory may also be used for storing variables or other intermediate information during execution of instructions to be executed by processor 1501. Possible implementations of this memory may be, but are not limited to, random access memory (RAM), read only memory (ROM), or both.

A storage device 1503 is also provided for storing information and instructions. Common forms of storage devices include, for example, a hard drive, a magnetic disk, an optical disk, a CD-ROM, a DVD, a flash memory, a USB memory card, or any other medium from which a computer can read.

Storage device 1503 may include source code, binary code, or software files for performing the techniques above, for example. Storage device and memory are both examples of computer readable media.

Computer system 1510 may be coupled via bus 1505 to a display 1512, such as a cathode ray tube (CRT) or liquid crystal display (LCD), for displaying information to a computer user. An input device 1511 such as a keyboard and/or mouse is coupled to bus 1505 for communicating information and command selections from the user to processor 1501. The combination of these components allows the user to communicate with the system. In some systems, bus 1505 may be divided into multiple specialized buses.

Computer system 1510 also includes a network interface 1504 coupled with bus 1505. Network interface 1504 may provide two-way data communication between computer system 1510 and the local network 1520. The network interface 1504 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1404 sends and receives electrical, electromagnetic, or optical signals that carry digital data streams representing various types of information.

Computer system 1510 can send and receive information, including messages or other interface actions, through the network interface 1504 across a local network 1520, an Intranet, or the Internet 1530. For a local network, computer system 1510 may communicate with a plurality of other computer machines, such as server 1515. Accordingly, computer system 1510 and server computer systems represented by server 1515 may form a cloud computing network, which may be programmed with processes described herein.

In an example involving the Internet, software components or services may reside on multiple different computer systems 1510 or servers 1531-1535 across the network. The processes described above may be implemented on one or more servers, for example. A server 1531 may transmit actions or messages from one component, through Internet 1530, local network 1520, and network interface 1504 to a component on computer system 1510. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
providing in a non-transitory computer readable storage medium, a database created in an application level language and comprising a first one-dimensional row partitioned store data structure, the database further comprising a second one-dimensional column partitioned store data structure;
receiving a new record for insertion into the database;
inserting the new record into the first one-dimensional row partitioned store;
a data movement manager stored in the non-transitory computer readable storage medium checking a uniqueness violation of the new record utilizing a scalable bloom filter for fast value existence checking, wherein a query time of the scalable bloom filter is $O(k \log n)$, where k=number of hash functions, and n=number of records;
following the checking of a uniqueness violation, the data movement manager asynchronously moving the new record to the second one-dimensional column partitioned store;
receiving a query from a user;
searching the first one-dimensional row partitioned store based upon a search condition of the query;
searching the second one-dimensional column partitioned store data structure based upon the query only if the scalable bloom filter returns a true value; and
returning to the user a search result based on the query, wherein the search result includes the new record and is formed by merging a search result of the row partitioned store with a search result of the column partitioned store.

2. The computer-implemented method of claim 1 further comprising maintaining a boundary condition of the column partition to limit access for future searching.

3. The computer-implemented method of claim 1 wherein the search condition comprises a key.

4. The computer-implemented method of claim 3 wherein the key comprises a private key.

5. The computer-implemented method of claim 3 wherein the key comprises a unique key.

6. A non-transitory computer readable storage medium embodying a computer program for performing a method comprising:
providing in a non-transitory computer readable storage medium, a database created in an application level language and comprising a first one-dimensional row partitioned store data structure, the database further comprising a second one-dimensional column partitioned store data structure;
receiving a new record for insertion into the database;
inserting the new record into the first one-dimensional row partitioned store;
a data movement manager stored in the non-transitory computer readable storage medium checking a uniqueness violation of the new record utilizing a scalable bloom filter for fast value existence checking, wherein a query time of the scalable bloom filter is $O(k \log n)$, where k=number of hash functions, and n=number of records;
following the checking of a uniqueness violation, the data movement manager asynchronously moving the new record to the second one-dimensional column partitioned store;
receiving a query from a user;
searching the first one-dimensional row partitioned store data structure of a database based on a search condition of the query;
searching the second one-dimensional column partitioned store data structure based upon the query only if the scalable bloom filter returns a true value; and
returning to the user a search result based on the query, wherein the search result includes the new record and is formed by merging a search result of the row partitioned store with a search result of the column partitioned store.

7. The non-transitory computer readable storage medium of claim 6 further comprising maintaining a boundary condition of the column partition to limit access for future searching.

8. The non-transitory computer readable storage medium of claim 6 wherein the search condition comprises a key.

9. A computer system comprising:
one or more processors;
a software program, executable on said computer system, the software program configured to:
provide in a non-transitory computer readable storage medium, a database created in an application level language and comprising a first one-dimensional row partitioned store data structure, the database further comprising a second one-dimensional column partitioned store data structure;
receive a new record for insertion into the database;
insert the new record into the first one-dimensional row partitioned store;
provide in the non-transitory computer readable storage medium, a data movement manager configured to check a uniqueness violation of the new record utilizing a scalable bloom filter for fast value existence checking, wherein a query time of the scalable bloom filter is $O(k \log n)$, where k=number of hash functions, and n=number of records, and following the uniqueness violation check asynchronously move the new record to the second one-dimensional column partitioned store;
receive a query from a user;
search the first one-dimensional row partitioned store data structure of the database based on a search condition of the query;
search the second one-dimensional column partitioned store data structure based upon the query only if the scalable bloom filter returns a true value; and
return to the user a search result based on the query, wherein the search result includes the new record and is formed by merging a search result of the row partitioned store with a search result of the column partitioned store.

10. The computer system of claim 9 wherein the software program is further configured to maintain a boundary condition of the column partition to limit access for future searching.

11. The computer system of claim 9 wherein the search condition comprises a key.

* * * * *